United States Patent [19]

Suzuki

[11] Patent Number: 5,061,462
[45] Date of Patent: Oct. 29, 1991

[54] APPARATUS FOR PRODUCING A STREAMER CORONA

[76] Inventor: Nagatoshi Suzuki, 5-7-7, Kugahara, Ota-ku, Tokyo, Japan

[21] Appl. No.: 412,606

[22] Filed: Sep. 27, 1989

Related U.S. Application Data

[63] Continuation of Ser. No. 120,012, Nov. 12, 1987, abandoned.

[51] Int. Cl.$^5$ .................. B01J 19/08; B01J 19/12; F01N 3/00; F02M 27/00
[52] U.S. Cl. .................. 422/186.04; 55/139; 55/141; 55/150; 55/152; 55/DIG. 30; 60/275; 123/536; 123/539; 313/351; 313/309; 422/186.18; 422/907
[58] Field of Search .................. 422/186.04, 186.18, 422/186.19, 907; 55/139, 141, 150, 152, 155, DIG. 30; 60/272, 275; 123/536, 539; 313/309, 351

[56] References Cited

U.S. PATENT DOCUMENTS

| | | | |
|---|---|---|---|
| 109,601 | 11/1870 | Dunderdale | 422/186.07 |
| 512,265 | 1/1894 | Andreoli | 422/186.07 |
| 640,694 | 1/1900 | Otto | 422/186.04 |
| 788,557 | 5/1905 | Sahlström | 422/186.07 |
| 832,768 | 10/1906 | Bridge | 422/186.04 |
| 871,652 | 11/1907 | Ward | 422/186.04 |
| 995,958 | 6/1911 | Goldberg | 422/186.07 |
| 1,157,859 | 10/1915 | Freet | 422/186.07 |
| 2,195,431 | 4/1940 | Shively et al. | 422/186.04 |
| 2,989,144 | 6/1961 | Syrie | 183/6 |
| 3,526,081 | 9/1970 | Kusters | 55/127 |
| 3,620,008 | 11/1971 | Newbold | 60/30 |
| 3,979,193 | 9/1976 | Sikich | 55/123 |
| 4,309,199 | 1/1982 | Suzuki | 55/127 |
| 4,320,301 | 3/1982 | Kogelschatz | 422/186.18 |
| 4,326,862 | 4/1982 | Suzuki | 55/127 |
| 4,587,807 | 7/1986 | Suzuki | 60/274 |
| 4,603,031 | 7/1986 | Gelbman | 422/186.18 |
| 4,690,803 | 9/1987 | Hirth | 422/186.18 |
| 4,693,870 | 9/1987 | Gloor et al. | 422/186.19 |
| 4,725,412 | 2/1988 | Ito | 422/186.19 |

FOREIGN PATENT DOCUMENTS 59-93915 5/1984 Japan .

OTHER PUBLICATIONS

Sumposium Proceedings, 7th International Symposium on Plasma Chemistry, vol. 2, Eindhoven, The Netherlands, Jul. 1–5, 1985.
Fujii et al., "Discharge Processing of Combustion Gas", a paper presented at the 3rd Symposium on Plasma Processing, Kiryu, Gumma Pref., Japan, Jan. 28–30, 1986 (with translation).

Primary Examiner—Howard J. Locker
Attorney, Agent, or Firm—Ronald P. Kananen

[57] ABSTRACT

An apparatus for producing a stable streamer corona discharge, used for example for cleaning exhaust gases of automobiles, has a first electrode including an electrical conductor which is made of a stainless steel bar having discrete protrusions or continuously formed protrusions produced on its surface by threading, the cross section of the protrusions being triangular or trapezoidal. A second electrode includes an electrical conductor disposed opposite to the first electrode with a space therebetween, and an insulating layer formed of suitable materials having high electrical resistances such as asbestos, ceramics, organic glasses or the like covers the second electrode over at least the whole surface opposing to the first electrode. A high voltage direct current supply or a high voltage alternating supply is connected to the first electrode and the second electrode.

9 Claims, 5 Drawing Sheets

APPARATUS FOR PRODUCING A STREAMER CORONA

BACKGROUND OF THE INVENTION

This is a continuation of Ser. No. 07/120,012, filed Nov. 12, 1987, now abandoned.

Field of the Invention

This invention relates to a corona producing apparatus used, for example, for cleaning exhaust gas of automobiles by corona discharge, and particularly to a streamer corona producing apparatus capable of producing a stable streamer corona discharge.

Description of the Prior Art

One of the well known arts of cleaning exhaust gases of automobiles is the one related to the apparatus for cleaning exhaust gases of engines shown in FIG. 1, in which a predetermined number of discharge wires 3 are positioned through and tightened in hollow spaces 1a of hollow circular dust-collecting cylinders 1, both the upper ends and the lower ends of the cylinders being connected to connecting pipes 2. A high voltage generated by a high voltage generator 4 is applied to the discharge wires 3 via a rectifier 5.

The high voltage generator 4 generates a high voltage of, for example, 12000 to 17000 volts, and this high voltage is applied to the discharge wires 3 after it is rectified by the rectifier 5. A strong electrostatic field is produced between the discharge wires 3 and the hollow circular dust-collecting cylinders 1 and, when exhaust gases of engines are caused to flow through the hollow circular dust-collecting cylinders 1, Coulomb forces due to the electrostatic field are exerted on harmful particles, such as tar or graphite, contained in the exhaust gases thereby causing the particles to be deposited on the inner walls of the hollow circular dust-collecting cylinders 1. Thus, the harmful particles contained in the exhaust gases from the engines are eliminated, and the exhaust gases are cleaned. In FIG. 1, the numeral 6 represents a high voltage cable and the numeral 7 represents a rectifier.

According to the aforementioned prior art, however, there exists a potential danger of cut-off of the discharge wires if arc discharge occurs between the hollow dust-collecting cylinders and the discharge wires. Furthermore, the ability of attracting and depositing the harmful particles is not adequate to eliminate the harmful gases such as NOx, COx or the like in the exhaust gases. Recently, an apparatus based on corona discharge was considered as one good way of producing discharge which activates such harmful gases and dissociates them to thereby eliminate those harmful gases, but conventional corona discharge was not sufficient to obtain the required ability of attracting and dissociating dust or the like contained in the exhaust gases. Consequently, generating a special kind of corona i.e., a streamer corona, was required in order to practically apply the technology of corona discharge to dissociating and eliminating the harmful gases. This streamer corona is required in a large size.

SUMMARY OF THE INVENTION

The present invention was made to solve the above-mentioned problem, and to provide an apparatus for producing a streamer corona contributing to the assurance of a stable streamer corona discharge, comprising a first electrode including an electrical conductor which is made of a stainless steel bar having discrete protrusions or continuously formed protrusions on its surface by threading, the cross section of the protrusions being triangular or trapezoidal; a second electrode including an electrical conductor disposed opposite to said first electrode with a space therebetween; an insulating layer formed of suitable materials having high electrical resistances such as asbestos, ceramics, organic glasses or the like which are clothed on said second electrode over at least the whole surface opposite to said first electrode; and a high voltage direct current supply or a high voltage alternating current supply connected to said first electrode and said second electrode. By this arrangement, the production of a stable streamer corona in a large scale is ensured. By forming the continuous protrusions into a thread-shape or the like on the surface of the first electrode, it is possible to produce a streamer corona over a wide area. Transition of discharge, due to the positive charge stored on the surface of the insulating layer, from corona discharge to arc discharge can be prevented, and there is no chance to cause wear and malfunction of the apparatus due to arc. If the apparatus for producing a streamer corona according to the invention is installed within exhaust gas pipes of automobiles, then it will be found very effective in dissociating harmful gases in exhaust gases or eliminating dust in the gases. The protrusions on the first electrode can be formed easily by cutting or sintering metal bars.

DESCRIPTION OF THE PREFERRED EMBODIMENTS

Figure 1:
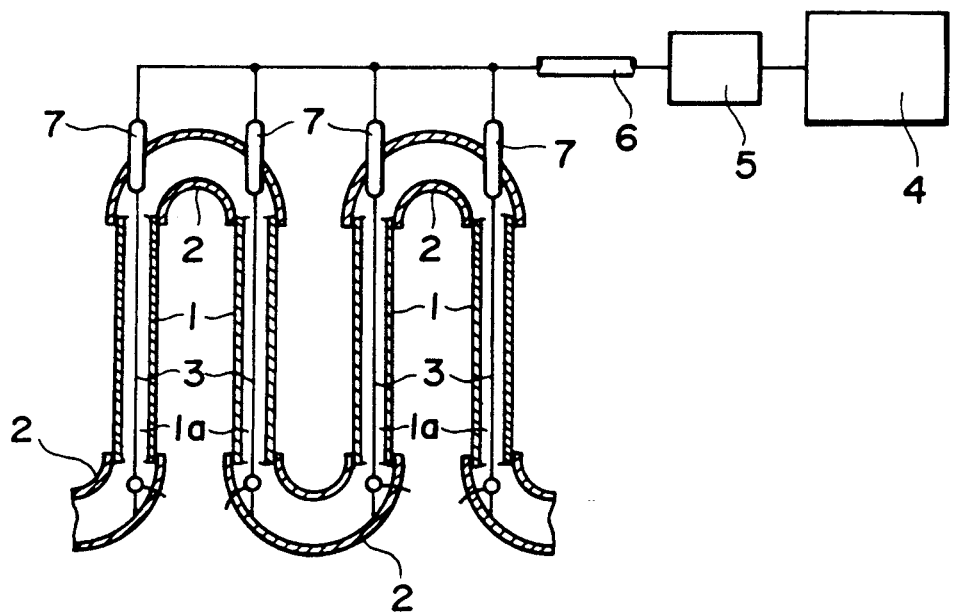
FIG. 1 is a diagram for illustrating a prior art apparatus for producing a streamer corona in the art to which the present invention pertains.
Figure 2:
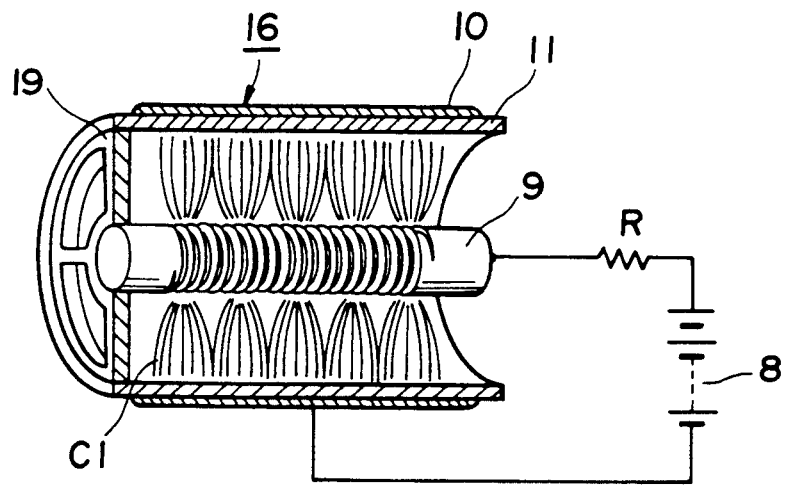
FIG. 2 is a vertical cross sectional view of a preferred embodiment of an apparatus for producing a streamer corona according to the invention.

A first embodiment of the invention is an apparatus for dissociating and eliminating harmful gases contained in exhaust gases of automobiles, which apparatus is operated from a direct current supply. FIG. 2 shows a vertical cross section of an apparatus for producing a streamer corona according to the invention, which apparatus is embodied within the exhaust pipe of an automobile.

Figure 3:
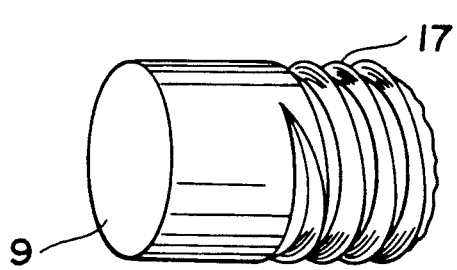
FIG. 3 is a perspective view of a relevant portion of protrusions with triangular cross section formed on the surface of an electrode of the apparatus of FIG. 2.
Figure 4:
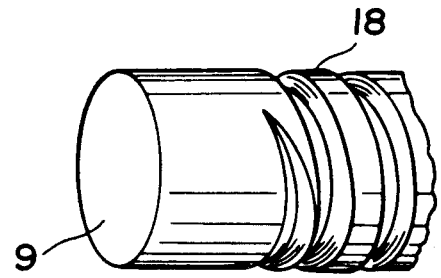
FIG. 4 is a perspective view of a relevant portion of protrusions with trapezoidal cross section formed on the surface of an electrode of the apparatus of FIG. 2.

A first electrode 9 is, for example, of a type in which a stainless metal bar is formed into a threaded bar by a cutting machine such as a milling machine or by a mold machine such as a sintering machine or whatever is appropriate. Furthermore, the threaded portion of the surface of the first electrode may be formed into protrusions 17 having a triangular cross section as shown in FIG. 3 or protrusions having a trapezoidal cross section 18 as shown in FIG. 4, by properly selecting the pitch of the threads. The electrode 9 is supported by a support member 19 made from insulating materials at the center of a hollow circular cylindrical shaped insulating layer 11 made from materials of high electrical resistances such as asbestos.

Around the outer surface, the insulating layer 11 is clothed with a second electrode 10 by printing metal paste on the surface of the insulating layer 11 and then forming the second electrode 10 by baking the coated insulating layer 11 in a furnace. As an alternative, the second electrode 10 can be made from a metal pipe, and then an enameled insulating layer of ceramics, organic glasses or the like can be formed on the inner surface of the second electrode 10.

As another alternative, a simple combination of an insulating pipe and a metal pipe may also be used. The first electrode 9 and the second electrode 10 are electrically connected to each other via a high voltage direct current supply 8 and a resistor R. The high voltage direct current supply 8 provides a high voltage of a single polarity and its output may be of a variety of waveforms such as DC, ripple, or pulse. The waveform may also be one in accordance with the output of ignition coils.

The continuous thread-shaped protrusions 17 or 18 formed on the surface of the first electrode 9 produce the streamer corona C1 over a wide area as shown in FIG. 2. Although the protrusions are shown as covering most of the length of the first electrode 9, they may also be provided at essential or selected portions of the first electrode 9. In the aforementioned embodiment, an insulating resistance of 400 Megohms for the insulating layer 11 has been found to be preferable when the direct current supply is 1 kv.

Figure 5:
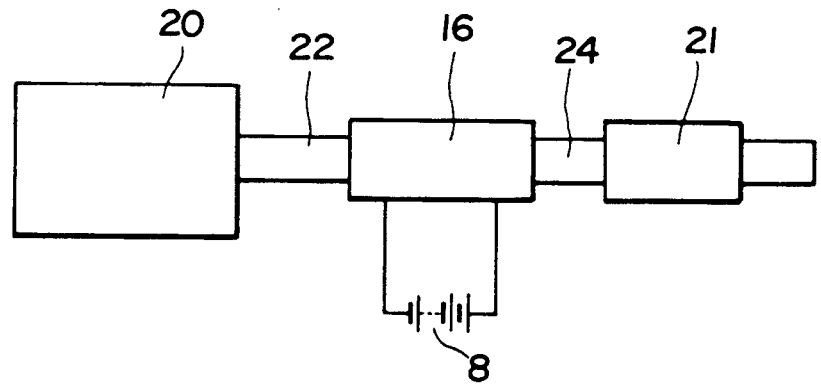
FIG. 5 is a diagram illustrating the apparatus of FIG. 2 for producing a streamer corona placed in the path of exhaust gas pipes of automobiles.

The apparatus for producing a streamer corona 16 thus constructed is placed in the path of an exhaust pipe 22 connecting an engine 20 and a muffler 21, as can be seen in FIG. 5. The apparatus for producing a streamer corona 16 may be integral with the muffler 21.

Figure 6:
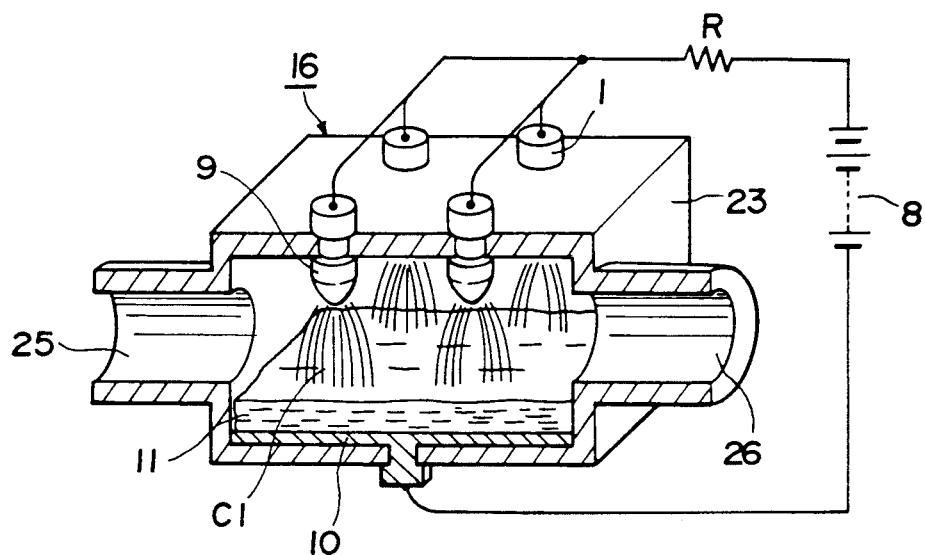
FIG. 6 is a vertical cross sectional view of another preferred embodiment of an apparatus for producing a streamer corona, to which the invention is practically applied.

As is shown in FIG. 6, in another form of the apparatus for producing a streamer corona 16, a stable streamer corona C1 of a large scale may be produced reliably in the space defined by the first electrodes 9 and the insulating layer 11. When the exhaust gases pass through the space, the harmful gases such as NOx or COx are activated under the influence of the streamer corona, thereby being freed from dust or dissociated to change to other types of cleaned gases or water. Thus, the harmful gases can be prevented from being exhausted into the air.

According to an experiment conducted by the inventor, when a direct current voltage of about 1 kv to 20 kv, which had been boosted up and then rectified at the high voltage direct current supply 8 shown in FIG. 2, was applied across the first electrode 9 and the second electrode 10, it was observed that a large scale corona discharge was induced over a wide area between the first electrode 9 and the insulating layer 11 which covers the surface of the second electrode 10. It was also observed that the stable streamer corona C1 was also maintained without decaying, during which the streamer corona C1 was produced while repeating the states illustrated in FIG. 7 to FIG. 9. The repetition rate was confirmed to be approximately several kiloherz.

Figure 7:
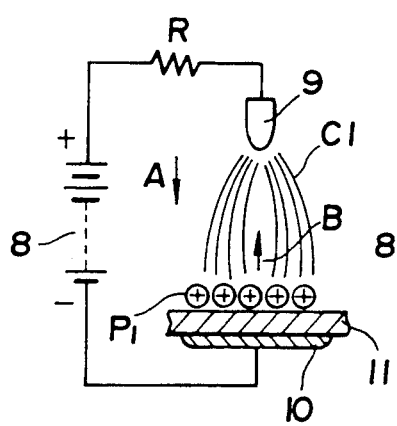
FIG. 7 is a schematic view of how a streamer corona is produced.

FIG. 7 shows a state in which a positive voltage is applied to a first electrode 9 via a resistor R, and a negative voltage is applied to a second electrode 10, respectively, from a direct current supply 8. An arrow A in FIG. 7 shows the direction of the electric field produced by the high voltage applied across the first electrode 9 and the second electrode 10; an arrow B shows the direction of the reverse electric field produced by the charge stored on the surface of an insulating layer 11; P1 shows the positive charge stored on the surface of the insulating layer 11; and C1 shows a positive corona, particularly a streamer corona, which is a greatly increased positive corona.

In FIG. 7, the streamer corona C1 is produced and the positive charge P1 is stored on the surface of the insulating layer 10. Thus, the reverse electric field B will grow in accordance with the amount of the positive charge P1. Then the streamer corona C1 will be suppressed with time to decay, thereby changing to a brush corona C2 shown in FIG. 8 or to a glow corona C3 shown in FIG. 9, which are produced only in the proximity of the first electrode 9.

The phenomenon of change and decay of a streamer corona occurs because of excessive storage of the positive charge P1. Therefore, the streamer corona can grow larger if a means for decreasing this excessive positive charge P1 is provided. The present invention assures the production of a streamer corona C1 by allowing the excessive positive charge P1 to leak and therefore to decrease under the influence of the insulating layer 11 which is formed of materials of high electrical resistances such as asbestos, as has been described.

Figure 8:
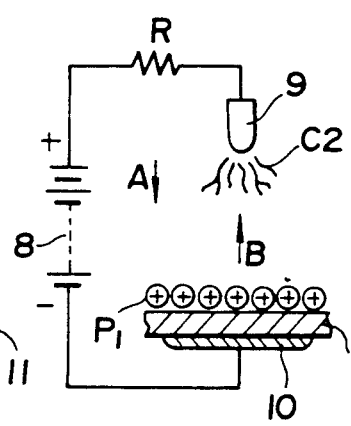
FIG. 8 is a schematic view of how a brush corona is produced.

FIG. 8 shows a state in which the streamer corona C1 changes, while decaying, to a brush corona C2 due to the reverse electric field B resulting from the increase of the positive charge P1 on the surface of the insulating layer 11.

Figure 9:
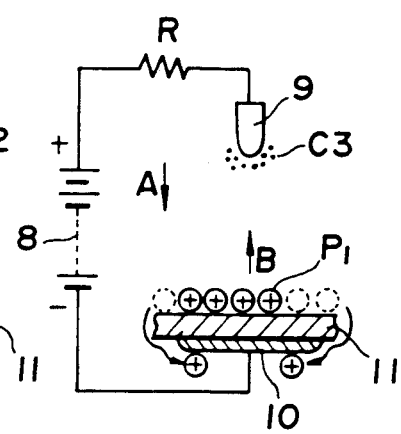
FIG. 9 is a schematic view of how a glow corona is produced.

FIG. 9 shows a state in which the streamer corona in FIG. 8 further changes and proceeds to a glow corona C3. The insulating layer 11 has a reasonably high electrical resistance, and the positive charge P1 leaks to the second electrode 10. Consequently, the positive charge P1 stored on the surface of the insulating layer 11 decreases gradually and the reverse electric field B also decreases accordingly. The production of the streamer corona is urged again under the influence of the decrease of the reverse electric field B, and the apparatus then returns to the state shown in FIG. 7. Thus, repeating the corona producing process shown in FIG. 7 to FIG. 9 permits continuous production of the streamer corona C1.

FIG. 6 is a vertical cross section of another embodiment according to the invention, in which a direct current supply is employed. The first electrodes 9 comprise metal columns having pointed ends, the electrodes 9 penetrating into an insulating box 23 through the top surface thereof. At the bottom of the insulating box 23, the second electrode 10 is disposed, and the second electrode 10 is covered with the insulating layer 11 formed of asbestos or the like, over its surface facing the first electrodes 9. The first electrodes 9 and the second electrode 10 are connected to each other via the high voltage direct current supply 8 and the resistor R. Furthermore, on the side of the insulating box 23 are communicating pipes 25 and 26 which communicate with the exhaust gas pipe 24 (FIG. 5). Thus, the streamer corona C1 is produced from respective first electrodes 9 toward the insulating layer 10, and the harmful gases are freed from dust or dissociated when passing through the streamer corona C1.

Figure 10:
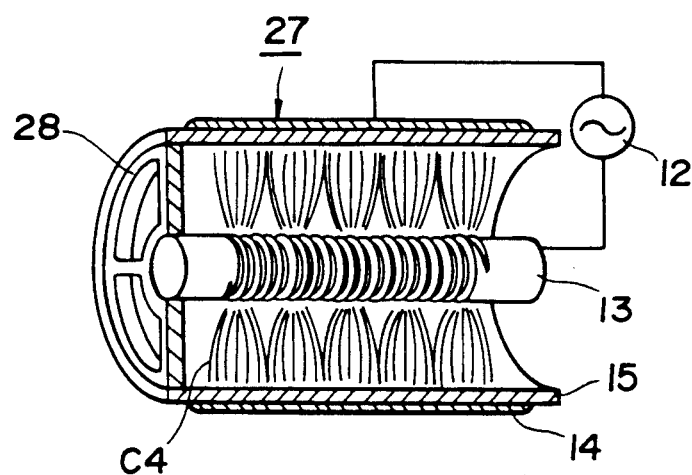
FIG. 10 is a vertical cross sectional view of yet another preferred embodiment according to the present invention.

Another embodiment of the invention is an apparatus for dissociating and eliminating harmful gases contained in exhaust gases of automobiles, which apparatus is operated from an alternating current supply. FIG. 10 shows a vertical cross section of an apparatus 27 for producing a streamer corona according to the invention, in which a first electrode 13 is the same as the first electrode 9 in the embodiment of FIGS. 2–4, a support member 28 made from insulating materials is the same as the support member 19, and an insulating layer 15 and a second electrode 14 are the same as the second electrode 10 and the insulating layer 11. Thus, all of the variations in structure and method of manufacture which relate to elements of the embodiment of FIGS. 2–4 apply to the embodiment of FIG. 10. The aforementioned first electrode 13 and second electrode 14 are electrically connected to each other via a high voltage alternating current supply 12 which provides a high voltage of positive and negative polarity with a certain frequency and has an output which may be a variety of waveforms such as sinusoid, or pulse. The frequency can be fixed or it can be synchronous with the outputs of ignition coils or revolutions of engines.

Figure 11:
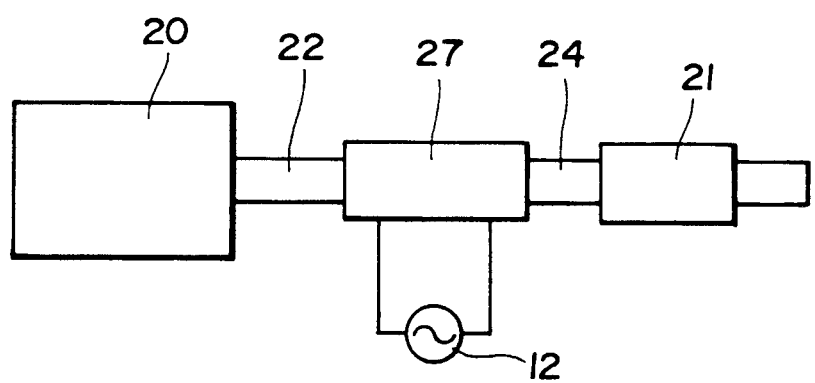
FIG. 11 shows the apparatus for producing a streamer corona shown in FIG. 10 placed in the path of an exhaust gas pipe of an automobile.

The apparatus 27 for producing a streamer corona thus constructed shares the configuration common to the first embodiment and the apparatus is interposed, as shown in FIG. 11, in the path of the exhaust pipe 22 connecting the engine 20 to the muffler 21. The apparatus 27 for producing a streamer corona may be integral with the muffler 21.

In the space defined by the first electrode 13 and the insulating layer 15 of the apparatus 27 for producing a streamer corona, a stable streamer corona C4 of a large scale may be produced reliably. When exhaust gases pass through the space, the harmful gases such as NOx or COx are activated under the influence of the streamer corona, thereby being dissociated to change to clean exhaust gases of other types or water, and thus the harmful gases can be prevented from being exhausted into the air.

According to an experiment made by the inventor, when a 50 Hz AC voltage of about 10 kv to 15 kv, which had been boosted up by a high voltage alternating supply 12 shown in FIG. 10, was applied across the first electrode 13 and the second electrode 14, it was observed that a large scale streamer corona discharge was induced over a wide area. Furthermore, the stable streamer corona obtained was also observed to be maintained without decaying.

As in the embodiment of FIGS. 2–4, continuous thread-shaped protrusions 17 or 18 are formed on the surface of the first electrode 13 to produce the streamer corona C4 over a wide area as shown in FIG. 10. The protrusions may also be provided only at essential or selected portions of the surface of the first electrode 13.

When a high voltage is applied across the first electrode 13 and the second electrode 14 from the alternating current supply 12, then the streamer corona is produced between the first electrode 13 and the insulating layer 15 on the second electrode 14, the states of the corona being shown in FIG. 12 to FIG. 14 and described as follows.

Figure 12:
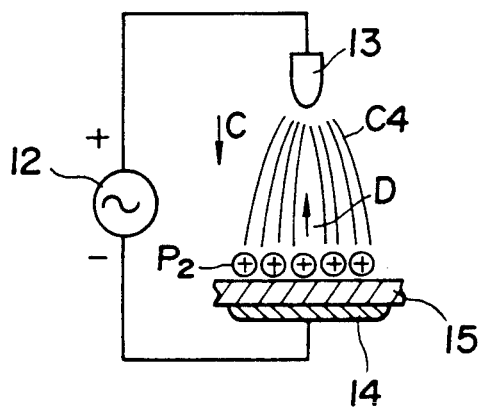
FIG. 12 is a schematic view of how a positive corona is produced in the apparatus of FIG. 10.

FIG. 12 shows a state in which the high voltage alternating current supply 12 applies a positive voltage to the first electrode 13 and a negative voltage to the second electrode 14. An arrow C in FIG. 12 designates the direction of the electric field produced by the high voltage applied between the first electrode 13 and the second electrode 14; and arrow D designates the direction of the reverse electric field resulting from the charge stored on the surface of an insulating layer 15; P2 shows positive charge stored on the surface of the insulating layer 15; and C4 shows a positive corona, particularly a streamer corona i.e., a positive corona which has grown greatly.

In FIG. 12, the streamer corona C4 is produced while the positive charge P2 is stored on the surface of the insulating layer 12. Thus, the reverse electric field D will increase in accordance with the amount of the positive charge P2, and the streamer corona C4 will be suppressed and will decay with time, thereby changing to a brush corona or a glow corona which is produced only in the proximity of the first electrode 13. This phenomenon of change and decay of the streamer corona C4 occurs because of excessive storage of the positive charge P2. Therefore, the streamer corona C4 can grow larger if the excessive positive charge P2 is decreased by any suitable means.

Figure 13:
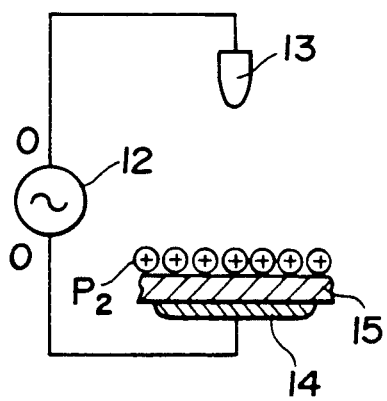
FIG. 13 is a schematic view of a zero point state in the apparatus of FIG. 10.
Figure 14:
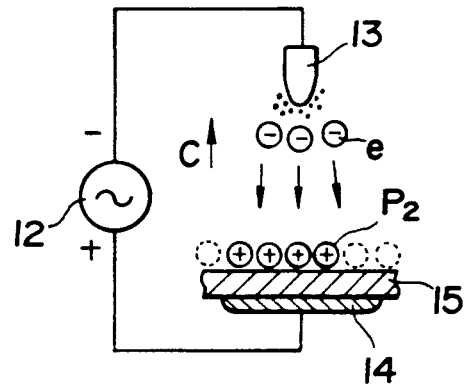
FIG. 14 is a schematic view of how a negative corona is produced in the apparatus of FIG. 10.

The present invention ensures the production of the streamer corona C4 by neutralizing the excessive positive charge P2, and thus decreasing P2, through the steps shown in FIG. 13 and FIG. 14. FIG. 13 shows a so-called zero point, where the polarity of the output of the high voltage alternating supply 12 changes, and the production of the corona is interrupted. FIG. 14 shows a reverse condition to that of FIG. 12, in which a negative voltage is applied to the first electrode 13 and a positive voltage is applied to the second electrode 14. The letter e designates electrons and the letter C4 designates a negative corona, respectively, in FIG. 14. In FIG. 14, the negative corona and the electrons e are produced at the first electrode 13, and the electrons e combine with the positive charges P2 stored on the surface of the insulating layer 15 to be neutralized. Consequently, the excessive positive charge P2 is reduced, and the streamer corona C4 is produced again when the state proceeds to the one shown in FIG. 12. Thus, repeating the corona producing process shown in FIG. 12 to FIG. 14 ensures the continuous production of the streamer corona C4.

I claim:

1. An apparatus for producing a streamer corona, comprising:

an insulating housing having first and second opposite sides and first and second opposite ends, said first end defining an inlet opening through which a gas to be treated enters the housing, and said second end defining an outlet opening through which the gas leaves the housing;

a plurality of first electrodes projecting from said first side toward said second side;

a second electrode adjacent to said second side of said housing and spaced from said first electrodes, said second electrode defining a plate having a surface disposed in opposing relation to said first electrodes;

a high resistance electrically insulating layer on said surface of said second electrode, said insulating layer covering at least a portion of said surface of said second electrode; and a high voltage supply connected to said first electrodes and said second electrode.

2. An apparatus for producing a streamer corona according to claim 1, wherein said high voltage supply is a high voltage direct current supply.

3. An apparatus for producing a streamer corona according to claim 2, wherein said insulating layer is made from asbestos.

4. An apparatus for producing a streamer corona according to claim 1, wherein the second electrode is spaced from the first electrodes in a vertical direction.

5. An apparatus for producing a streamer corona according to claim 1, wherein each said first electrode has a pointed end directed toward said second electrode.

6. An apparatus for producing a streamer corona according to claim 1, wherein said first and second ends extend transverse to said first and second sides.

7. An apparatus for producing a streamer corona according to claim 4, wherein said first side is the top side of the insulating housing and said second side is the bottom side of said insulating housing.

8. An apparatus for producing a streamer corona according to claim 5, wherein each said first electrode is a metal column.

9. An apparatus for cleaning the exhaust gases of a vehicle having an engine and an exhaust line extending from the engine, comprising:

an insulating housing having first and second opposite sides and first and second opposite ends, said first end defining an inlet opening through which a gas to be treated enters the housing, and said second end defining an outlet opening through which the gas leaves the housing;

a plurality of first electrodes projecting from said first side toward said second side;

a second electrode adjacent to said second side of said housing and spaced from said first electrodes, said second electrode defining a plate having a surface disposed in opposing relation to said first electrodes;

a high resistance electrically insulating layer on said surface of said second electrode, said insulating layer covering at least a portion of said surface of said second electrode; and a high voltage supply connected to said first electrodes and said second electrode, said insulating housing being connected to said exhaust line so that the exhaust gases pass through said insulating housing.

* * * * *